3,595,938
POLYETHYLENE GLYCOL TEREPHTHALATE/POLY - 1,4 - DIMETHYLOL-CYCLOHEXANE TEREPHTHALATE BLOCK COPOLYESTER THERMOPLASTIC MOULDING COMPOSITIONS

Klaus Weissermel, Kelkheim, Taunus, and Ludwig Brinkmann and Walter Herwig, Frankfurt am Main, Germany, assignors to Farbwerke Hoechst Aktiengesellschaft vormals Meister Lucius & Bruning, Frankfurt am Main, Germany
No Drawing. Filed Sept. 26, 1968, Ser. No. 762,984
Claims priority, application Germany, Oct. 7, 1967,
P 17 20 722.6
Int. Cl. C08g $39/10$
U.S. Cl. 260—860                    5 Claims

ABSTRACT OF THE DISCLOSURE

Thermoplastic moulding compositions comprising block copolyesters of polyethylene glycol terephthalate units and poly-1,4 - dimethylolcyclohexane terephthalate units from which mouldings having a high impact strength and bending strength can be produced.

---

It is known that polyester moulding compositions which contain linear saturated polyesters of aromatic dicarboxylic acids can be processed to give partially crystalline mouldings. For example, polyethylene glycol terephthalate may be injection moulded, and the speed of crystallisation and degree of crystallinity of the resulting mouldings can be influenced by the addition of suitable nucleating agents. The mouldings thus obtained are, however, characterised by only a moderate impact strength.

The present invention provides a process for the manufacture of a thermoplastic moulding composition comprising a high molecular weight block copolyester that contains from 10% to 98% by weight of ethylene glycol terephthalate units and from 90% to 2% by weight of 1,4-dimethylolcyclohexane terephthalate units, which process comprises copolymerizing poly(ethylene glycol terephthalate) and poly-1,4-dimethylol-cyclohexane terephthalate at an elevated temperature and at a reduced pressure.

Suitable materials for the manufacture of high molecular weight impact-resistant thermoplastic moulding compositions according to the invention are poly(ethylene glycol terephthalates) having a reduced viscosity, in dl./g. (measured in a 1% strength solution in a 60:40 mixture of phenol and tetrachlorethane at 25° C.), of between 0.6 and 2.0, preferably between 0.8 and 1.6, and poly-1,4-dimethylol-cyclohexane terephthalates having a reduced viscosity in dl./g. (measured in a 1% strength solution in a 60:40 mixture of phenol and tetrachlorethane at 25° C.), of between 0.7 and 1.4, preferably between 0.8 and 1.2.

The manufacture of the block condensates of the invention can be effected in various ways. For example, poly(ethylene glycol terephthalate) may be thoroughly mixed with finely divided poly(1,4-dimethylol-cyclohexane terephthalate), fused in an extruder, extruded whilst cooling and granulated, the extrusion temperature depending on the mixing ratio of the two starting polyesters. The granular material thus obtained may then be subjected to a solid condensation at an elevated temperature until the desired molecular weight has been reached.

The speed of the block condensation increases with increasing temperature and the temperature must be so chosen that no softening of the granules occurs during the trans-esterification. Thorough exclusion of air and moisture, are advantageous.

In general, the reaction may be ended when the block polyester has reached a reduced viscosity in dl./g. (measured in a 1% strength solution in a 60:40 mixture of phenol and tetrachlorethane at 25° C.), of between 1.0 and 1.8, preferably between 1.2 and 1.6.

Another method of manufacture of high molecular impact-resistant block polycondensates is based on the reaction of poly(ethylene glycol terephthalate) with poly-1,4-dimethylol-cyclohexane terephthalate in the melt, and here again thorough mixing and uniform temperature control must be provided. After completion of the block condensation in the homogeneous melt the condensation product is extruded in a granular form according to known methods.

In order to retain the block structure of the copolyesters and not to produce, through further transesterification reactions, copolyesters which contain the components in statistical distribution it is advisable not to keep the polyesters above their melting point for long. The process in which the main reaction takes place in the solid phase is therefore to be preferred.

The polycondensation of the starting condensates and the block polycondensation as a rule take place alongside one another. The extent of the block polycondensation depends largely on the chosen polycondensation conditions.

It is also possible to add nucleating agents to the polyester moulding compositions according to the invention during the block polycondensation in the melt or in the solid state or even after they are completed, these nucleating agents having the function of increasing the speed of crystallisation of the polycondensates during processing and ensuring that the process products reach a good degree of crystallisation. Mouldings having a high degree of crystallisation remain stable in shape even above the second-order transition temperature and do not shrink. Finely divided inorganic substances such as calcium carbonate, aluminum silicate or talc may be employed as nucleating agents. In many cases it is also advantageous to use a combination of several nucleating agents which may be both inorganic and organic in nature.

In order to reduce the moisture uptake, the granular polyester moulding compositions according to the invention may be provided with a coating of an inert hydrophobic substance, for example, paraffin or wax.

The block polycondensates, according to the invention, of poly(ethylene glycol terephthalate) and poly-1,4-dimethylol-cyclohexane terephthalate differ significantly in differential thermal analysis, from polyesters which are synthesized from dimethyl terephthalate, glycol and 1,4-dimethylol-cyclohexane. The differential thermograms of the block polycondensates show two different second-order transition temperatures and two different melting point ranges which can be allocated to the individual blocks.

The block polycondensates according to the invention can be thermoplastically processed to give dimensionally stable mouldings which are distinguished by a higher impact strength than that of polyethylene glycol terephthalates.

In order to obtain crystalline or partially crystalline mouldings on processing the mould temperature must be sufficiently high above the second-order transition temperature of the block polycondensate employed. The polyester moulding compositions thus obtained are distinguished, in addition to high impact strength and flexural strength, by extraordinarily good surface hardness, high glass, good solvent resistance and low moisture uptake. They permit the manufacture of high quality materials for machining, such as for example gearwheels, clutch discs, and spindle bearings, and may be used alone or in combination with known fillers, for example, glass fibre, asbestos or graphite.

The following example illustrates the invention:

EXAMPLE 70 parts of finely divided poly(ethylene glycol terephthalate) having a reduced viscosity of 1.5 dl./g. and 30 parts of finely divided poly(1,4-dimethylol-cyclohexane terephthalate) having a reduced viscosity of 1.0 dl./g. were carefully dried (water content <0.01% by weight), thoroughly mixed, and then extruded and granulated. The cylinder temperature was 285° C. The granules were subjected to a solid condensation at 240° C. for 6 hours at 0.5 mm. The resulting solid condensation product had a reduced viscosity of 1.2 dl./g. It was rolled with 0.2% by weight of China clay Dinkie A for nucleating purposes, under nitrogen for two hours at room temperature. It was thereafter rolled for 5 hours with 0.4% by weight of paraffin (dropping point 56° C.) at 90° C.

Sheets of size 60 x 60 x 2 mm. were injection moulded from the material manufactured in this way, at a mould temperature of 150° C. These sheets had good dimensional stability, coupled with high gloss and high surface hardness. The injection temperature was 280° C., and the injection time was 15 seconds.

The impact strength of the sheets was tested by a drop test in which the sheets were subjected to an impact stress by allowing a falling body sliding on low friction tracks to fall vertically from different heights onto a sheet clamped in a frame. The tip of the dropping hammer represented a hemisphere of radius 10 mm. The dropping hammer weighed 500 g. The dropping height was used as a measure of the impact strength; the recorded value, $F_{20}$, was the height at which the impact energy sufficed to produce fracture in 20% of the sheets tested. 10 sheets were tested for each height.

The recorded drop height, $F_{20}$, was 100 cm. in the case of the block condensates according to the invention.

The impact strength of a polyester of terephthalic acid and ethylene glycol having a $\eta_{red}$ value of 1.40 dl./g. (measured in a 1% strength solution in a 60:40 mixture of phenol and tetrachloroethane at 25° C.) was measured for comparison. It was $F_{20}=50$ cm.

What is claimed is:

1. High molecular weight block copolyester consisting essentially of having a reduced viscosity in dl./g. (measured in a 1% strength solution in a 60:40 mixture of phenol and tetrachlorethane at 25° C.), of between 1.0 and 1.8
   (a) 10 to 98% by weight of polyethylene glycol terephthalate and
   (b) 90-2% by weight of poly - 1,4 - dimethylol-cyclohexane terephthalate, relative to the total amount, which copolyester is manufactured by block copolymerization in the melt or in the solid state at elevated temperature and under reduced pressure, said polyethylene glycol terephthalate having a reduced viscosity in dl./g. (measured in a 1% strength solution in a 60:40 mixture of phenol and tetrachlorethane at 25° C.), of between 0.6 and 2.0 and said poly-1,4-dimethylolcyclohexane terephthalate having a reduced viscosity in dl./g. (measured in a 1% strength solution in a 60:40 mixture of phenol and tetrachlorethane at 250° C.), of between 0.7 and 1.4.

2. High molecular weight block copolyester as claimed in claim 1, wherein the polyethylene glycol terephthalate has a reduced specific viscosity of from 0.8 to 1.6 dl./g., measured in a 1% strength solution in phenol/tetrachlorethane 60:40 at 25° C.

3. High molecular weight block copolyester as claimed in claim 1, wherein the poly-1,4-dimethylol-cyclohexane terephthalate has a reduced specific viscosity of from 0.8 to 1.2 dl./g., measured in a 1% strength solution in phenol/tetrachloroethane at 25° C.

4. High molecular weight block copolyester as claimed in claim 1, having a reduced specific viscosity of from 1.2 to 1.6, measured in a 1% strength solution in phenol/tetrachlorethane 60:40 at 25° C.

5. Injection molded shaped article prepared from a high molecular weight block copolyester having a reduced viscosity in dl./g. (measured in a 1% strength solution in a 60:40 mixture of phenol and tetrachlorethane at 25° C.), of between 1.0 and 1.8 consisting essentially of
   (a) 10 to 98% by weight of polyethylene glycol terephthalate and
   (b) 90 to 2% by weight of poly-1,4-dimethylolcyclohexane terephthalate, said polyethylene glycol terephthalate having a reduced viscosity in dl./g. (measured in a 1% strength solution in a 60:40 mixture of phenol and tetrachlorethane at 25° C.), of between 0.6 and 2.0 and said poly-1,4-dimethylolcyclohexane terephthalate having a reduced viscosity in dl./g. (measured in a 1% strength solution in a 60:40 mixture of phenol and tetrachlorethane at 25° C.), of between 0.7 and 1.4.

References Cited

UNITED STATES PATENTS

| | | | |
|---|---|---|---|
| 3,117,950 | 1/1964 | Kibler et al. | 260—860 |
| 3,331,889 | 7/1967 | Caldwell et al. | 260—860 |

FOREIGN PATENTS

| | | | |
|---|---|---|---|
| 1,040,470 | 8/1966 | Great Britain | 260—860 |
| 1,104,089 | 2/1968 | Great Britain | 260—860 |
| 734,040 | 5/1966 | Canada | 260—860 |

WILLIAM H. SHORT, Primary Examiner

E. WOODBERRY, Assistant Examiner